US012809525B2

(12) United States Patent
Moreno Vega et al.

(10) Patent No.: US 12,809,525 B2
(45) Date of Patent: Nov. 24, 2026

(54) DIGITAL CIRCUIT AND METHOD OF OPERATION IN A DIGITAL CIRCUIT

(71) Applicant: SEMIDYNAMICS TECHNOLOGY SERVICES, S.L., Barcelona (ES)

(72) Inventors: Alberto Moreno Vega, Barcelona (ES); Víctor Moya Del Barrio, Barcelona (ES)

(73) Assignee: SEMIDYNAMICS TECHNOLOGY SERVICES, S.L., Barcelona (ES)

( * ) Notice: Subject to any disclaimer, the term of this patent is extended or adjusted under 35 U.S.C. 154(b) by 0 days.

(21) Appl. No.: 19/233,208

(22) Filed: Jun. 10, 2025

(65) Prior Publication Data

US 2025/0383779 A1 Dec. 18, 2025

(30) Foreign Application Priority Data

Jun. 17, 2024 (EP) .................................... 24382654

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
None
See application file for complete search history.

(56) References Cited

U.S. PATENT DOCUMENTS 5,767,798 A 6/1998 Won
2006/0230241 A1* 10/2006 Mehta .............. H04N 21/23406 711/154
2007/0255905 A1 11/2007 Morrow
2013/0031432 A1 1/2013 Sutardja et al.
2023/0280781 A1 9/2023 Savage et al.

FOREIGN PATENT DOCUMENTS

WO WO-2023235146 A1 * 12/2023 ........... G06F 9/3851

OTHER PUBLICATIONS

European Search Report for Application No. 24382654.2, dated Dec. 11, 2024, 9 pages.

* cited by examiner

*Primary Examiner* — Brian R Peugh
(74) *Attorney, Agent, or Firm* — CANTOR COLBURN LLP

(57) ABSTRACT

A digital circuit includes a target memory, a pattern memory, a pattern-enable array, and a multiplexer, wherein the target memory is configured to store entries and output a respective output; and the pattern memory is configured to store a pattern and to output a respective output. The pattern-enable array includes memory elements each of which is associated with a respective address of a corresponding one of the entries and is configured to be set to a state indicative of whether the respective address is associated with the stored pattern or not; the multiplexer is configured to select between the received respective output of the target memory and the received respective output of the pattern memory using the output of the pattern-enable array for enabling the selection. A method of operation in a digital circuit is also related.

15 Claims, 13 Drawing Sheets

DIGITAL CIRCUIT AND METHOD OF OPERATION IN A DIGITAL CIRCUIT

CROSS-REFERENCE TO RELATED APPLICATIONS

This application claims the benefit of European patent application 24382654.2, filed on 17 Jun. 2024, the disclosure of which is incorporated herein by reference in its entirety.

TECHNICAL FIELD

The present disclosure relates to a digital circuit. Also, the present disclosure relates to a method of operation in a digital circuit.

BACKGROUND

Integrated digital circuits typically integrate and make use of memories, i.e. memory element circuits, in order to store or buffer data for later use of said data. Some examples of these memory elements are SRAMs (Static Random Access Memories), DRAMs (Dynamic Random Access Memories), sea of latches, or others. Also, such memory circuits may exhibit different trade-offs with respect to different resources or properties such as area, latency, throughput, or power. For example, a sea of latches may often use a larger area and may have a higher power footprint compared to an SRAM, in exchange for having a lower latency. Similarly, a DRAM may often be smaller, slower, and less power-hungry than an equivalent SRAM, at the cost of even slower access latency and throughput. Another aspect related to these memory element circuits often is the number of read and write ports. This is related to the number of concurrent accesses (either read or write) that can happen in a memory. Adding access ports into a memory may significantly increase the memory's area and power footprint, and may be a very challenging task to achieve, especially for the larger memory circuits. Moreover, with respect to access time, latency, and throughput, for a lot of different types of conventional memories often it's not possible to completely write the whole of the memory, or even a significant amount of it, in a single clock cycle. This may be particularly important with respect to the utilization of said memories in a digital circuit for storing and/or accessing in a single clock cycle a pattern of bits. Hence, an important drawback of many conventional types of memory elements and of digital circuits which include said memory elements, is that they do not allow for accessing and/or writing a large pattern of bits in a single clock cycle. Given this drawback of many known conventional types of memory elements (i.e. memories), there is needed a mechanism for overcoming said drawback.

SUMMARY

The present disclosure overcomes the aforementioned drawback of known conventional memory element circuits. Advantageously, the present disclosure allows for allowing or improving the utilization of said different types of memories for storing or accessing in a single clock cycle a pattern of bits, even in cases were said pattern of bits when stored on a memory could occupy a large portion or even the whole of the memory. Advantageously, the present disclosure is easy to implement without increasing significantly the cost or the complexity of an electronic circuit.

A first aspect of the disclosure concerns a digital circuit which comprises a target memory, a pattern memory, a pattern-enable array and a multiplexer, wherein the target memory is configured to store therein entries and to output a respective output of data related to any one of the entries; the pattern memory is configured to store therein a pattern and to output a respective output of data related to the pattern; the pattern-enable array comprises memory elements each of which is associated with a respective address of a corresponding one of the entries of the target memory and is configured to be reversibly set to a state which is indicative of whether the respective address of the corresponding entry of the target memory is associated with the stored pattern or not; the pattern-enable array is further configured to receive a corresponding input related to any one of the memory elements and to output a respective output which is indicative of the state of the corresponding memory element; the multiplexer is configured to receive the respective outputs of the target memory, the pattern memory and of the pattern-enable array, to select between the received respective output of the target memory and the received respective output of the pattern memory using the output of the pattern-enable array for enabling the selection, and to output the selected output.

The target memory may be understood as being a memory the functionality of which can be advantageously enhanced by the aforementioned configuration which includes the pattern-enable array and the target memory. Said functionality may be enhanced because the aforementioned pattern-enable array and the pattern memory may advantageously allow for associating a pattern with part or even the whole of the target memory. This may in turn allow for advantageously identifying whether said pattern needs to be accessed/outputted or not in a single clock cycle. Moreover, the aforementioned configuration of the digital circuit of the first aspect of the disclosure may advantageously allow for accessing and/or writing said pattern in a single clock cycle, even in cases where pattern may comprise a large number of bits.

It is noted that the target memory of the circuit may be considered as being a first memory of the digital circuit, so it can be distinguished from the pattern-enable array which may considered as being or comprising a second memory of the digital circuit. Likewise, the pattern memory may be called third memory. Also, the aforementioned multiplexer of the circuit may alternatively be called first multiplexer to be distinguished from any other multiplexer that some preferred embodiments of the disclosure may also comprise as described further below. Also, it is noted that said multiplexer (i.e. first multiplexer) may also be called "data selector" or "first data selector".

In a preferred embodiment of the disclosure, the pattern-enable array is configured to receive a respective input which comprises: a pattern address input for indicating the address of a respective entry with which the pattern is to be associated with; a pattern enable input for indicating that the address of the respective entry indicated by the pattern address input should be associated with the pattern. It may be understood that said pattern address input may advantageously serve for indicating the address of the entry in (for) which a user of the circuit may want to set a pattern. Also, said pattern enable input may advantageously serve for indicating that the entry indicated by the "pattern address input" should be associated with the pattern stored in the pattern memory.

In a preferred embodiment of the first aspect of the disclosure, hereafter referred to as exemplary embodiment, the target memory is configured to receive a respective input which comprises: an input read address for specifying a corresponding entry to be accessed in the target memory; an input write address for specifying a corresponding entry to be updated in the target memory; a data bus input for indicating data to be written in the target memory for updating the corresponding entry of the target memory; a write enable input for indicating a request for a write operation to be performed at the target memory. It may be understood that said input read address, input write address, data bus input and write enable input that may preferably be received by the target memory of the exemplary embodiment during an operation of the digital circuit, can advantageously serve for facilitating modifying entries in the target memory in case that said target memory is not static but is dynamic i.e. in case the information stored into the target memory after an original setting of the digital circuit can be changed.

In a preferred embodiment which is according to the aforementioned exemplary embodiment, the input of the pattern-enable array comprises said input read address, said input write address and said write enable input. This may advantageously facilitate resetting if required one or more memory elements of the pattern-enable array in the case of a change in the corresponding entries stored in the target memory and/or a change in the association between said entries and the stored pattern.

In a preferred embodiment which is according to the previous one, the digital circuit further comprises an additional multiplexer via which the pattern-enable array provides its output. Preferably said additional multiplexer is part of the pattern-enable array and/or is configured to receive the input read address as a select line of said additional multiplexer. Said additional multiplexer may also be called second multiplexer for being further distinguished from the first multiplexer mentioned further above. Also, it may be understood that the use of said second multiplexer and the latter's configuration to receive and use the input read address as a select line, may advantageously facilitate selecting the proper memory in the PEA for indicating whether the data from a target memory or the pattern from the pattern memory should be used during an operation of the digital circuit, for example in an operation that may involve accessing said data in a single clock cycle or in more than one clock cycles. Also, it may be understood that the aforementioned select line of a multiplexer, e.g. of the aforementioned first multiplexer or of the aforementioned second multiplexer, can be understood as being an input (of the respective multiplexer) for directing the selection (by the multiplexer) between two or more other inputs received by the multiplexer.

In a preferred embodiment which is according to the aforementioned exemplary embodiment, the output of the target memory comprises data stored in the corresponding entry which is specified by the input read address. Hence, this latter configuration may facilitate the utilization of data stored in the target memory, because if during an operation of the digital circuit the multiplexer (i.e. the first multiplexer) selects to output the target memory's output, advantageously the output of the multiplexer may comprise the data stored in the corresponding entry which was indicated by the input read address received by the target memory.

In a preferred embodiment which is according to the aforementioned exemplary embodiment, the target memory is configured to allow updating one or more portions of one of the entries while leaving the rest of said one of the entries unchanged, each of said portions corresponding to a byte, such that the target memory has a byte enable functionality; the respective input of the target memory further comprises a byte enable signal input which comprises bits each of which corresponds to a respective byte of the data bus input, such that the value of each bit of the byte enable signal input indicates whether each of the bytes of the corresponding entry of the target memory should be updated according to the corresponding byte of the data bus input or not. The latter preferred embodiment may advantageously allow for achieving fine control of write data, i.e. of the data to be written on the target memory, so that only specific bytes of data may be written to the target memory.

In a preferred embodiment which is according to the aforementioned exemplary embodiment, the digital circuit further comprises a byte enable circuit communicatively connected to the target memory, the pattern memory and the pattern-enable array; the byte enable circuit (8) is configured to receive an initial data bus input and to provide to the target memory the data bus input; the pattern memory is configured to provide to the byte enable circuit its respective output of data related to the pattern stored in the pattern memory; the pattern-enable array is configured to provide to the byte enable circuit a signal indicative of whether the corresponding entry to be updated according to the input write address is associated with the stored pattern or not; the byte enable circuit is configured to receive an initial byte enable signal which comprises bits each of which corresponds to a respective byte of the initial data bus input such that the value of each bit of the initial byte enable signal indicates whether the respective byte of the initial data bus input should be updated according to a corresponding byte of the output of the pattern memory or not; when the signal provided to the byte enable circuit by the pattern-enable array indicates that the corresponding entry to be updated is associated with the stored pattern, the byte enable circuit is configured to transform the initial data bus input into the data bus input such that during the transformation the bytes of the initial bus input are updated or not according to what is indicated by the initial byte enable signal, said corresponding entry being specified by the input write address. The configuration of this latter embodiment advantageously allows obtaining a digital circuit which is according to the first aspect of the disclosure and at the same time exhibits a byte enabling functionality which facilitates achieving fine control of write data, i.e. of the data to be written on the target memory, so that only specific bytes of data may be written to the target memory.

In a preferred embodiment of the first aspect of the disclosure, the digital circuit further comprises reset means which, when one of the entries of the target memory is updated, said reset means is configured to automatically set the respective memory elements of the pattern-enable array to the state that is indicative that the corresponding address of the updated entry is not associated with the stored pattern. It is noted that said optional reset means may preferably be incorporated in the pattern enable array. This may advantageously allow for avoiding errors in the association between the pattern of the patent memory and the entries in the target memory, when said entries are changed. Hence, preferably the pattern enable array may be configured to receive an input that comprises the aforementioned write-enable input and when according to said write-enable input one or more of the entries of the target memory is updated, the pattern-enable array may be configured to set the respective memory elements of the pattern-enable array to the state that is indicative that the corresponding address of the updated entry is not associated with the stored pattern.

In a preferred embodiment of the first aspect of the disclosure, the pattern memory is rewritable such that the pattern stored therein can be changed or updated. This advantageously allows for utilizing a dynamic pattern i.e. a pattern that may be changed or updated, for thereby further improving the functionality and versatility of the digital circuit. However, it is noted that in another preferred embodiment, the pattern is static i.e. it can not change after an initial storage or setting of said pattern in the pattern memory.

In a preferred embodiment of the first aspect of the disclosure, the pattern memory is configured to store therein a plurality of patterns which are associable with one or more of the entries of the target memory. This may advantageously enable associating different patterns with different entries, thereby further improving the functionality and versatility of the digital circuit.

A second aspect of the disclosure concerns a method of operation in a digital circuit which comprises a target memory, a pattern memory, a pattern-enable array and a multiplexer, the method comprising: storing entries in the target memory; storing a pattern in the pattern memory; wherein the pattern-enable array comprises memory elements each of which is associated with a respective address of a corresponding one of the entries of the target memory and is configured to be reversibly set to a state which is indicative of whether the respective address of the corresponding entry of the target memory is associated with the stored pattern or not; the method further comprising: the pattern-enable array receiving a corresponding input related to any one of the memory elements, and outputting a respective output which is indicative of the state of the memory elements; the multiplexer receiving respective outputs outputted from the target memory, the pattern memory and of the pattern-enable array, selecting between the received respective outputs of the target memory and of the pattern memory using the output of the pattern-enable array for directing the selection, and outputting the selected output.

In a preferred embodiment of the second aspect of the present disclosure, the method further comprises setting the state of any one of the memory elements using the corresponding input received by the pattern-enable array. This way advantageously the information stored by the memory elements may be controlled and/or updated.

Also, in a preferred embodiment of the second aspect of the present disclosure, the method further comprises: updating any one of the entries of the target memory; and setting automatically the respective memory elements which is associated with the respective address of the updated entry to the state that is indicative that said respective address of the updated entry is not associated with the stored pattern.

Also, in a preferred embodiment of the second aspect of the present disclosure, the method further comprises updating the pattern in the pattern memory.

It may be understood that the method of the second aspect of the disclosure may be implemented using the digital circuit of the first aspect of the disclosure. Hence, it may be understood that any optional or preferable features mentioned herein with respect to the first aspect of the disclosure, may correspond to respective optional or preferable features of the second aspect of the disclosure, and vice versa.

Additional advantages and features of the disclosure will become apparent from the detailed description that follows and will be particularly pointed out in the appended claims.

BRIEF DESCRIPTION OF THE DRAWINGS

To complete the description and in order to provide for a better understanding of the disclosure, a set of drawings is provided. Said drawings form an integral part of the description and illustrate embodiments of the disclosure, which should not be interpreted as restricting the scope of the disclosure, but just as examples of how the disclosure can be carried out. The drawings comprise the following figures.

DETAILED DESCRIPTION OF THE DRAWINGS

The following description is not to be taken in a limiting sense but is given solely for the purpose of describing the broad principles of the disclosure. Next embodiments of the disclosure will be described by way of example, with reference to the above-mentioned drawings, showing digital circuits and methods according to the disclosure, and some related operations and other information.

A preferred embodiment of a digital circuit of the first aspect of the disclosure is explained next with reference to FIG. 1. The digital circuit ("FMP") of FIG. 1 comprises a target memory 2 ("TM"), a pattern memory 3 ("PM"), a pattern-enable array 4 ("PEA") and a multiplexer 5. The multiplexer 5 is communicatively connected to each one of the TM, the PEA and the PEA.

Figure 1:
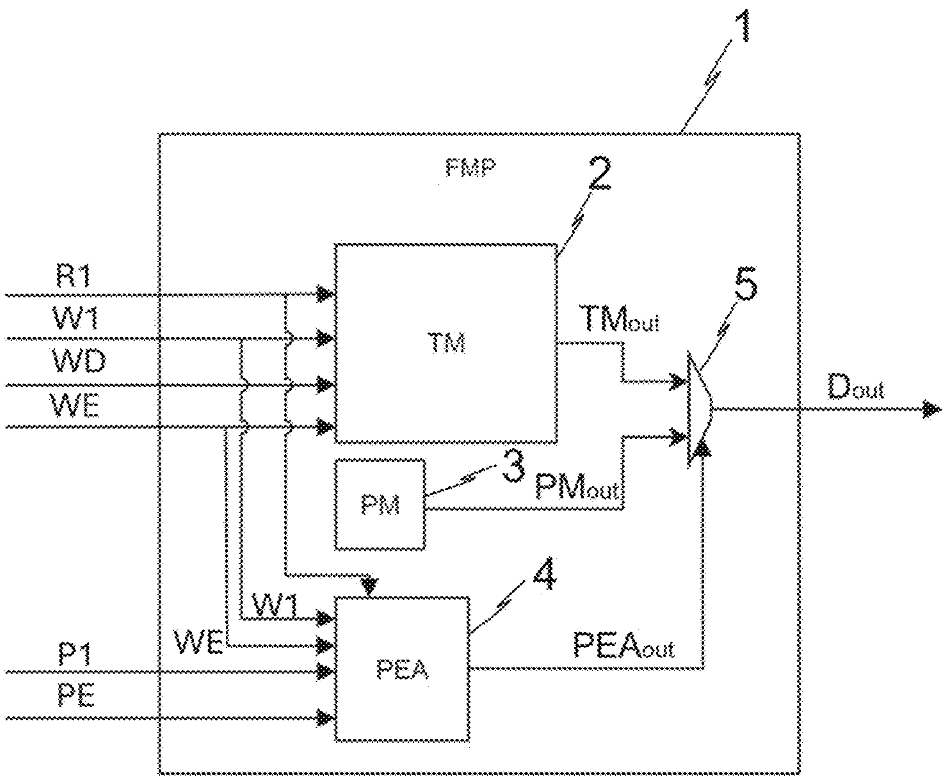
FIG. 1 illustrates a preferred embodiment of a digital circuit according to the first aspect of the disclosure.

In the embodiment of FIG. 1 the target memory 2 is configured to store therein entries, i.e. entries of data, and to output a respective output $TM_{out}$ of data related to any one of the entries. It may be understood that an address may act as a way to identify an entry. Also, as illustrated in FIG. 1, the target memory 2 is configured to receive as input the following: an input read address R1, an input write address W1, a data bus input WD, and a write enable input WE. The input read address R1 specifies a corresponding entry to be accessed in the target memory 2. The input write address W1 specifies a corresponding entry to be updated (e.g. modified) in the target memory 2. The data bus input WD indicates data to be written in the target memory 2 for updating the corresponding entry of the target memory 2. The write enable input WE indicates a request for the performance of a write operation at the target memory 2. It is noted that that in the embodiment of FIG. 1 different known types of memories may be used as the target memory 2. In some non-limiting examples, the target memory is one of the following types: a memory composed of flip-flops or latches, an SRAM, a DRAM or a different type of memory.

In the embodiment of FIG. 1, the pattern memory 3 is configured to store therein a pattern and to output a respective output $PM_{out}$ of data related to the pattern. Said output $PM_{out}$ may preferably be the pattern which is stored in the pattern memory. It is noted that said pattern memory may either be one wherein the stored pattern is static (i.e. cannot be changed after implementation) or a dynamic pattern. A dynamic pattern may be accomplished by implementing a suitable storage solution for the desired pattern. Said storage solution may be one that is compatible with the technology of the overall integrated circuit. Therefore, in some non-limiting examples, the pattern memory is a memory that comprises Flip-Flops, or a memory that comprises latches, or an SRAM, or a DRAMs or a memory of a different type. Therefore, in a preferred embodiment which is according to the one of FIG. 1, the pattern memory 3 is rewritable such that the pattern stored therein can be changed or updated. It is noted that in the optional case that the pattern memory (PM) is suitable for storing therein a dynamic pattern, typically the procedure to update the PM may include the PM receiving a write enable signal along with a data input indicating the desired pattern, so that the pattern stored in the PM is modified as commanded by said data input and write enable signal.

In the embodiment of FIG. 1, the pattern-enable array 4 comprises memory elements 6 each of which is associated with a respective address of a corresponding one of the entries of the target memory 2 and is configured to be reversibly set to a state which is indicative of whether the respective address of the corresponding entry of the target memory 2 is associated with the stored pattern or not. Preferably said state corresponds to the value of at least one bit that may be stored in each of said elements. Therefore, in a non-limiting example, when the value of a bit stored in a memory element of the pattern-enable array is "1" and said memory element is associated with an address of the target memory, wherein in said address an entry or part of said entry is stored, then said value of "1" may indicate that said address is associated with the pattern which is stored in the pattern memory. If however said value is "0", then this may indicate that the said address of the target memory, and consequently the entry that is stored in said address, is not associated with the pattern stored in the pattern memory. However, it is noted that the opposite may also occur in some embodiments i.e. when the value of a bit stored in a memory element of the pattern-enable array is 0 that may indicate that the corresponding address and stored entry in the target memory are associated with the pattern, whereas when said value is "1" that may indicate that said corresponding address and stored entry are not associated with the pattern. It is also noted that, in the present text saying that a memory element has been set to a state that indicates that the corresponding address or entry in the target memory is associated with the pattern stored in the pattern memory, may also be expressed by saying that said memory element or the pattern-enable array as a whole has been "enabled". Also, in the present text saying that said address or entry in the target memory is associated with the pattern, may also be expressed by saying that for said address or entry the pattern is "active". Also, with respect to the memory elements of the pattern-enable array, it is noted that preferably each one of said memory elements is able to (i.e. is configured to or suitable to): store at least one bit per every accessible entry in the target memory in order to indicate whether the pattern is active or not; and be written in the desired access time (in particular, for 1-cycle writes this element must be able to write in 1 cycle). In some non-limiting examples, said memory elements are composed of flip-flops or latches, which may store 1 bit of information per element as a bistable multivibrator. However, other types of memory elements may alternatively be used.

In the embodiment of FIG. 1, the pattern-enable array 4 is further configured to receive a corresponding input related to any one of the memory elements 6, and to output a respective output $PEA_{out}$ which is indicative of the state of the corresponding memory element 6. More specifically, when in the embodiment of FIG. 1 the digital circuit is in operation, the input that may be received by pattern-enable array 4 may comprise a pattern address input P1 and a pattern enable input PE. The pattern address input P1 indicates the address of a respective entry with which the pattern is to be associated with. The pattern enable input PE indicates that the address of the respective entry indicated by the pattern address input P1 should be associated with the pattern. Therefore, in a an operation of a preferred embodiment, P1 may indicate a specific address or entry in the target memory, and PE may indicate that the corresponding memory element (i.e. the memory element that corresponds to said specific address or entry) in the pattern-enable array should be "enabled" (e.g. set the value of a bit stored in said memory element to "1") so that the pattern is "active" for said specific address or entry. Also, in the embodiment of FIG. 1, when the digital circuit is in operation, the input that may be received by pattern-enable array 4 may further comprise the input read address R1, the input write address W1 and the write enable input WE which have been mentioned further above.

Also, in the embodiment of FIG. 1, the multiplexer 5 is configured to receive as respective inputs the output $TM_{out}$ of the target memory 2, the output $PM_{out}$ of the pattern memory 3 and the output $PEA_{out}$ of the pattern-enable array 4. Also, the multiplexer 5 is configured to select between said output $TM_{out}$ of the target memory 2 and said output $PM_{out}$ of the pattern memory 3, using the output $PEA_{out}$ of the pattern-enable array 4 for enabling the selection. Specifically, as can be understood from FIG. 1, the output $PEA_{out}$ of the pattern-enable array 4 is received by the multiplexer 5 as an input, and acts as a select line that determines which one of the other two inputs $TM_{out}$ and $PM_{out}$ of the multiplexer should be passed to the output $D_{out}$ of the multiplexer 5.

Figure 2:
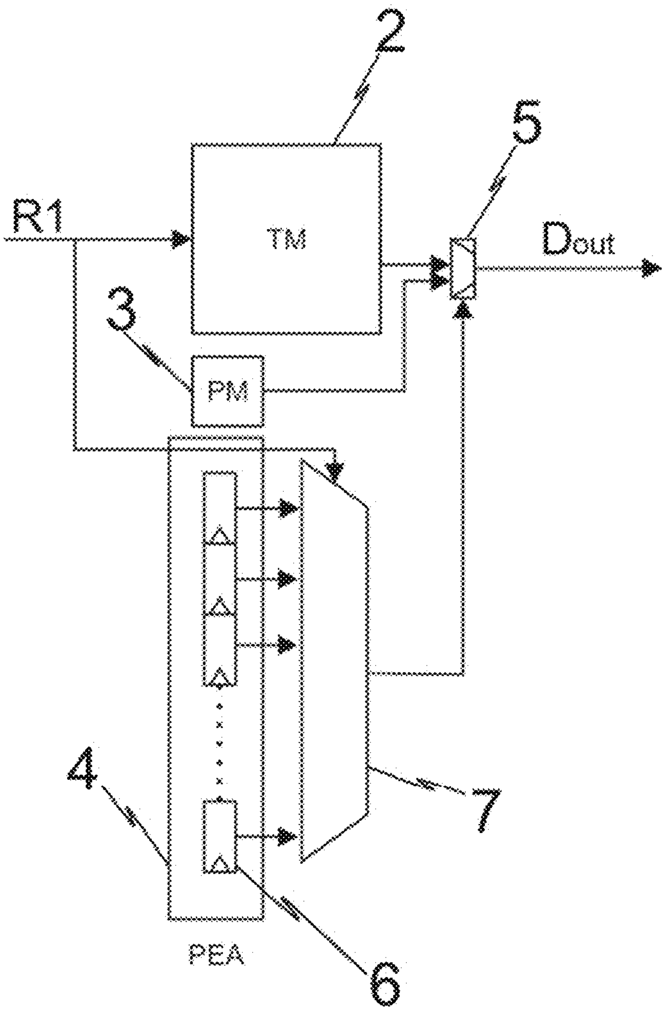
FIG. 2 illustrates a preferred embodiment of a digital circuit according to the first aspect of the disclosure.

A preferred embodiment of a digital circuit of the first aspect of the disclosure is explained next with reference to FIG. 2. The embodiment of FIG. 2 is according to the embodiment of FIG. 1 and hence comprises all the aforementioned features of the embodiment of FIG. 1. Also, the embodiment of FIG. 2 comprises an additional multiplexer 7 via which the output $PEA_{out}$ of the pattern-enable array 4 is provided to the first multiplexer 5 of the digital circuit. Said additional multiplexer may preferably be integrated in, and hence be part of, the pattern enable array, or may be a separate part of the digital circuit. Also, in the embodiment of FIG. 2, said additional multiplexer 7 is configured to receive the input read address R1 as a select line. Hence, in the embodiment of FIG. 2 said input read address R1 is used to feed the additional multiplexer 7 in order to select the proper entry/stored information in the PEA which will indicate whether the data from the TM or the pattern from the PM should be the output $D_{out}$ of the first multiplexer 5. It is noted that other schemes are also possible depending on the characteristics of the TM. In particular, it is a contemplated that in the optional case that the TM outputs data in a cycle different than when the address is set (a common case for larger memories), the address may need to be stored in the PEA or in another suitable optional component of the digital circuit, in order to facilitate or enable that a pattern enable bit in the PEA is driven at the appropriate time.

Figure 3:
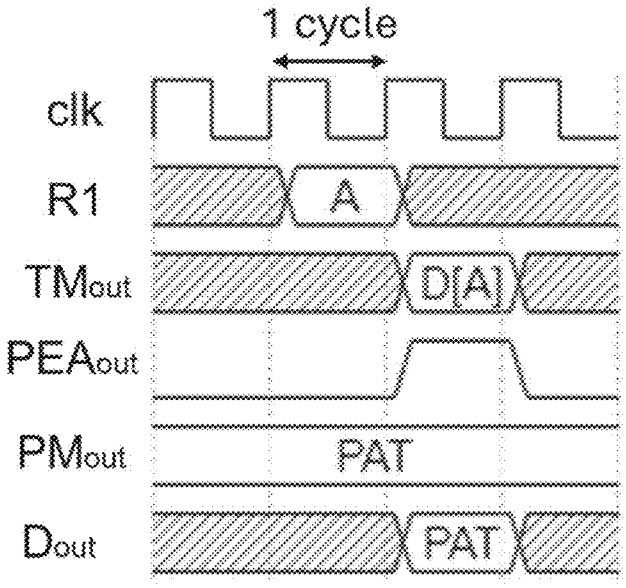
FIG. 3 illustrates a cycle-by-cycle diagram of a possible operation in the embodiment of FIG. 1.
Figure 4:
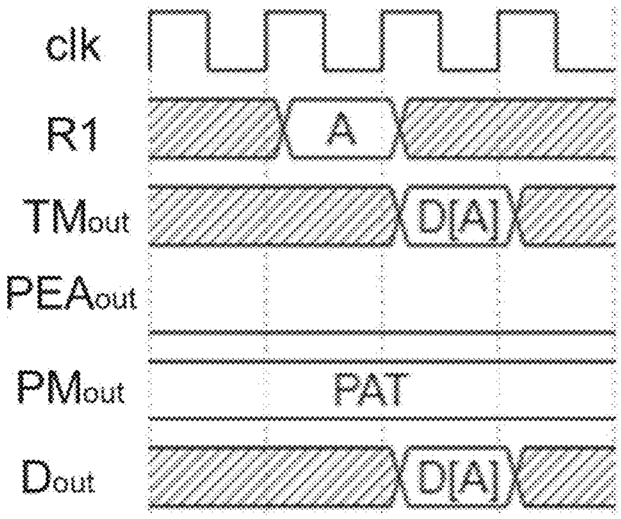
FIG. 4 illustrates a cycle-by-cycle diagram of a possible operation in the embodiment of FIG. 1.

An operation that may be made in/with any one of the preferred embodiments of FIG. 1 and FIG. 2 is illustrated by the diagram of FIG. 3. In the diagram of FIG. 3 "clk" indicates clock pulses of a repeating clock signal used in the digital circuit, and the time interval between two consecutive pulses sets the duration of 1 cycle (i.e. clock cycle) as indicated in FIG. 3. If when using said digital circuit a user of the circuit wants to read entry A, then R1 will be fed into the TM to indicate that entry A must be read/accessed, and the resulting output $TM_{out}$ from the TM will be D[A] as shown in FIG. 3. Also, if according to the information stored in the PEA, the pattern which is stored in the PM is "active" for said entry A, then this is indicated by the output $PEA_{out}$ shown in FIG. 3. Also, the PM outputs an output $PM_{out}$ which corresponds to the pattern and is the signal PAT that is indicated in FIG. 3. Due to the fact that the $PEA_{out}$ indicates that the pattern is "active" for said entry A, the multiplexer 5 selects PAT over $TM_{out}$, and hence, the output $D_{out}$ of the multiplexer 5 will be PAT as shown in FIG. 3. Therefore, the data that are read during the operation illustrated by FIG. 3, will be the data contained in the pattern. However, in the same preferred embodiment, if the pattern was not set for entry A, i.e. if said pattern is not "active" for said entry A and, hence, the corresponding state of the respective memory element of the PEA indicates that there is no association between the pattern and the respective address of the entry in the TM (e.g. if the value of a bit stored in said memory element is set to "0") then $PEA_{out}$ may be a flat signal as illustrated in FIG. 4. Then, as is also illustrated by FIG. 4, during the operation of the digital circuit the data that would be read and outputted by the multiplexer would be the data contained in the TM. Hence, in the case of the operation illustrated by FIG. 4, $D_{out}$=D[A]. It is noted that in/with some embodiments which are similar to the ones of FIG. 1 and FIG. 2, there may be performed operations which are similar to the ones shown in FIG. 3 and FIG. 4, but in which the duration from the moment R1 is fed into the TM until the moment that the $D_{out}$ is outputted by the multiplexer 5 may be different compared to the one shown in FIG. 3 and FIG. 4, and particularly, said duration may be less than the duration of one cycle or may be equal to the total duration of a plurality of cycles.

Figure 5:
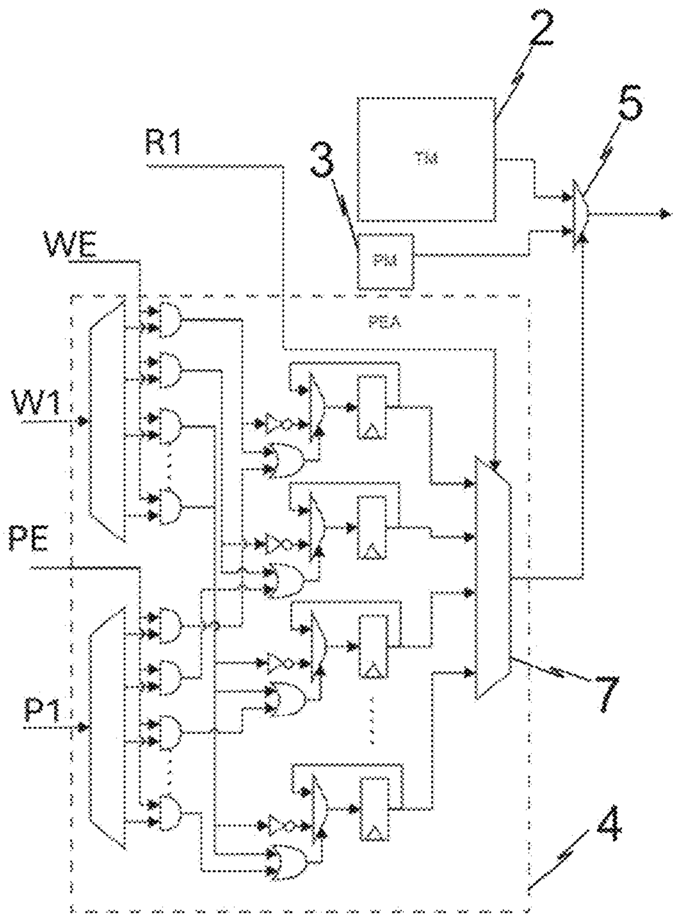
FIG. 5 illustrates a preferred embodiment of a digital circuit according to the first aspect of the disclosure.

A preferred embodiment of a digital circuit of the first aspect of the disclosure is explained next with reference to FIG. 5. The embodiment of FIG. 5 is according to the embodiments of FIG. 1 and FIG. 2, and hence comprises all the aforementioned features of the embodiments of FIGS. 1 and 2. However, in contrast to the embodiment of FIG. 2, in the embodiment of FIG. 5 the additional multiplexer 7 is part of the pattern-enable array 4 ("PEA"). Also, in the embodiment of FIG. 5 said pattern-enable array 4 comprises two decoders shown on the left of FIG. 5. The decoders are configured to transform an address into a 1-hot bit that corresponds to the entry of the address. For example, an address "5" will be decoded into a series of "0"s where only the bit number "5" will be set to "1" instead of "0". The decoder on top is configured to decode the write address which is indicated by W1, while the decoder on the bottom is configured to decode the pattern address which is indicated by P1. When the pattern enable signal PE is set, i.e. when PE indicates that the pattern should be associated with the address given by P1, the pattern enable cell (i.e. the memory element of the PEA) corresponding to said address given by P1 will be set to "1". When the write enable signal WE is set, i.e. when WE indicates a modification/update of the entry in the address indicated by W1, then the Pattern Enable cell corresponding to the write address given by W1 will be set to "0". If both addresses aim at the same entry, the corresponding Pattern Enable cell will be set to "0". It is noted that for memories with several write ports, several decoders may be used. Similarly, it is possible to add several pattern enable ports by adding more decoders.

In a preferred embodiment which is according to the embodiments of FIG. 1 and FIG. 5, the target memory 2 is configured to allow updating one or more portions of one of the entries while leaving the rest of said one entry unchanged, each of said portions corresponding to a byte, such that the target memory 2 has a byte enable functionality. Also, in said embodiment where the target memory has the byte enable functionality, the respective input of the target memory 2 further comprises a byte enable signal input BE. Said byte enable signal input BE comprises bits each of which corresponds to a respective byte of the data bus input WD, such that the value of each bit of the byte enable signal input BE indicates whether each of the bytes of the corresponding entry of the target memory 2 should be updated according to the corresponding byte of the data bus input WD or not.

Figure 7:
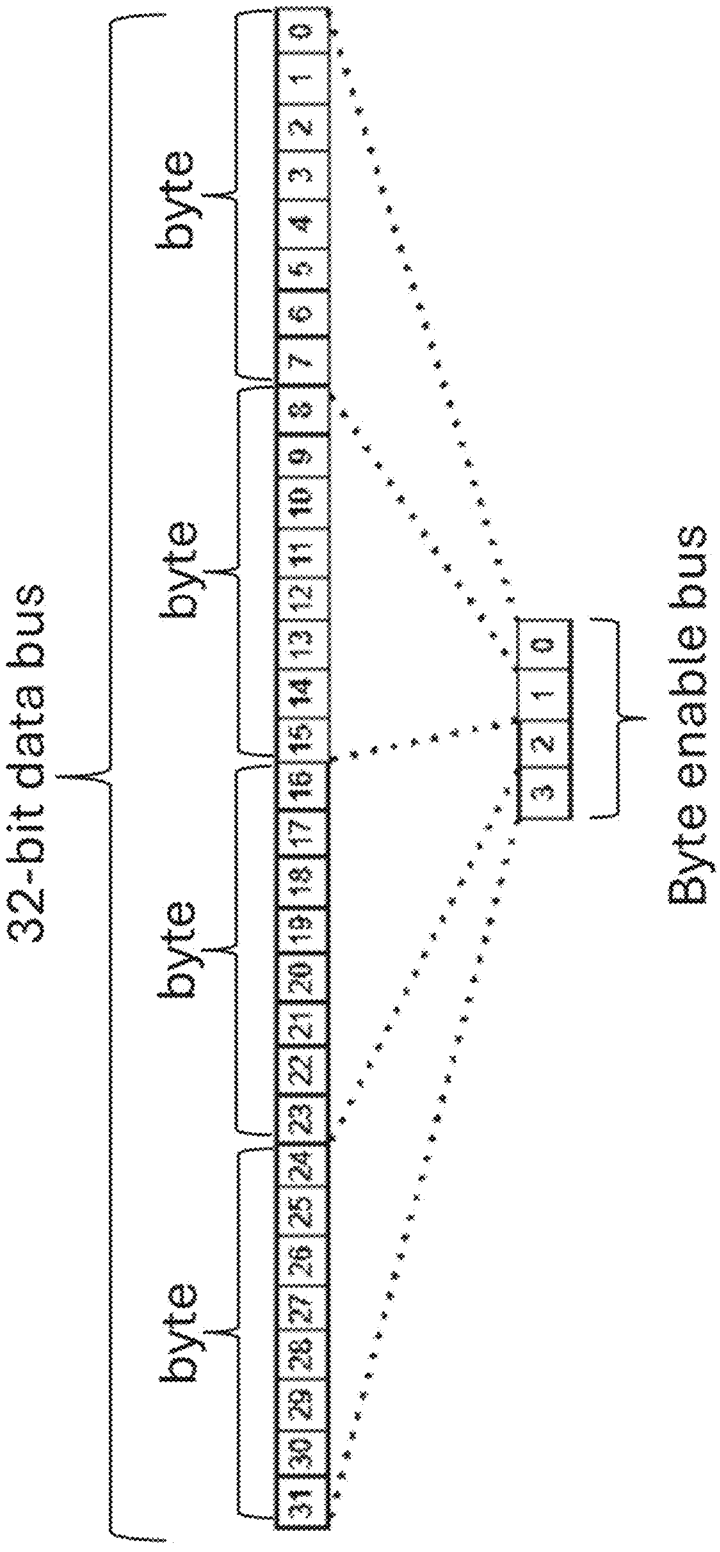
FIG. 7 illustrates examples of data inputs related to an operation of a preferred embodiment of a digital circuit according to the disclosure.
Figure 8:
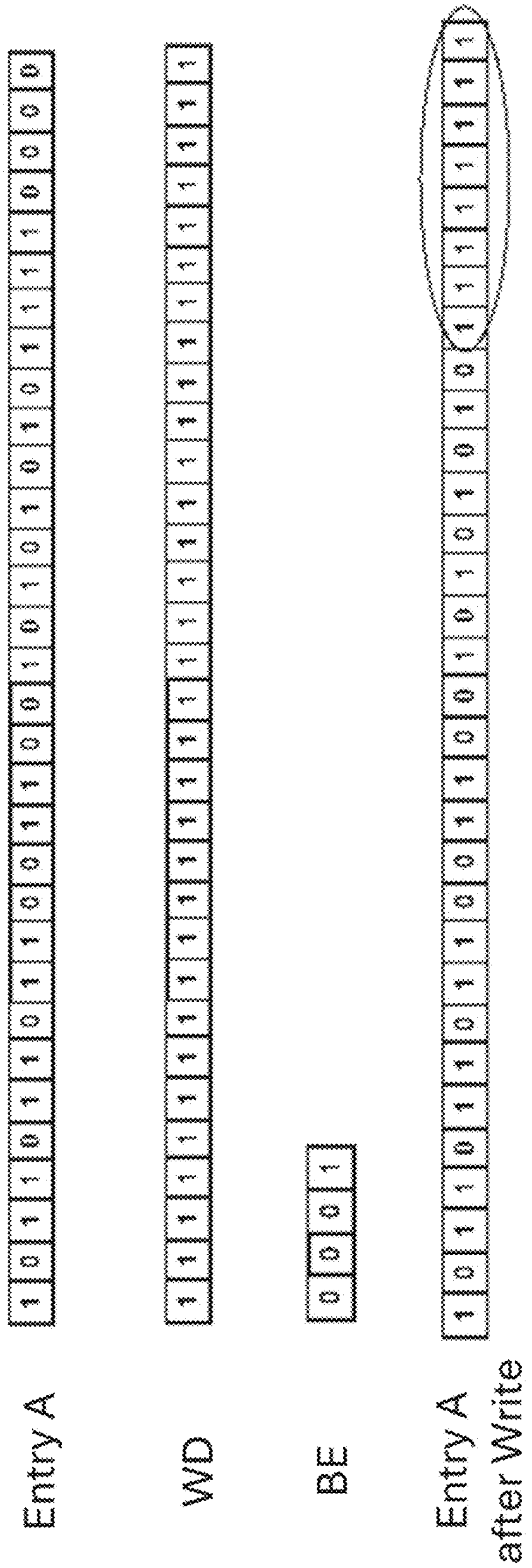
FIG. 8 illustrates examples of data inputs and entries related to an operation of a preferred embodiment of a digital circuit according to the disclosure.

A non-limiting example of an operation that may be performed in a preferred embodiment that comprises the aforementioned target memory with the byte enable functionality is explained next with reference to FIG. 7 and FIG. 8. In the latter preferred embodiment, the target memory with the byte enable functionality advantageously allows writing only in portions of a memory entry, while leaving the other portions undisturbed. For the implementation of said byte enable functionality the target memory may be able to receive as input a byte enable signal BE via a byte enable bus. A byte enable bus may be ⅛th of the size of a data bus. Every bit in the byte enable bus may corresponds to a byte in the data bus. FIG. 7 schematically illustrates a 32-bit data bus with enumerated bits from "0" to "31", and also illustrates a corresponding byte enable bus of four bits (since 32/8=4). When writing into said target memory that has the byte enable functionality, only the bytes that correspond to the byte enable signal BE set to "1" will be written. For example, FIG. 8 shows an entry A stored in the target memory memory. FIG. 8 also shows the data bus input WD which a user wishes to use for modifying the entry A. Hence, it can be understood that in the example of FIG. 8, the user wishes to modify entry A and write all "1"s into this entry of the target memory. However, in the same example, in the byte enable signal BE only one of the bits is set to "1", whereas the rest of the bits of the BE are "0"s, as shown in FIG. 8. Consequently, in this case, the only part of the Entry A which will be updated/changed will be the last byte which corresponding to the BE's bit which was set to "1". Consequently, after the write operation, the only part of the entry A that is changed compared to the original entry A is the one that is circled as illustrated in FIG. 8.

Figure 6:
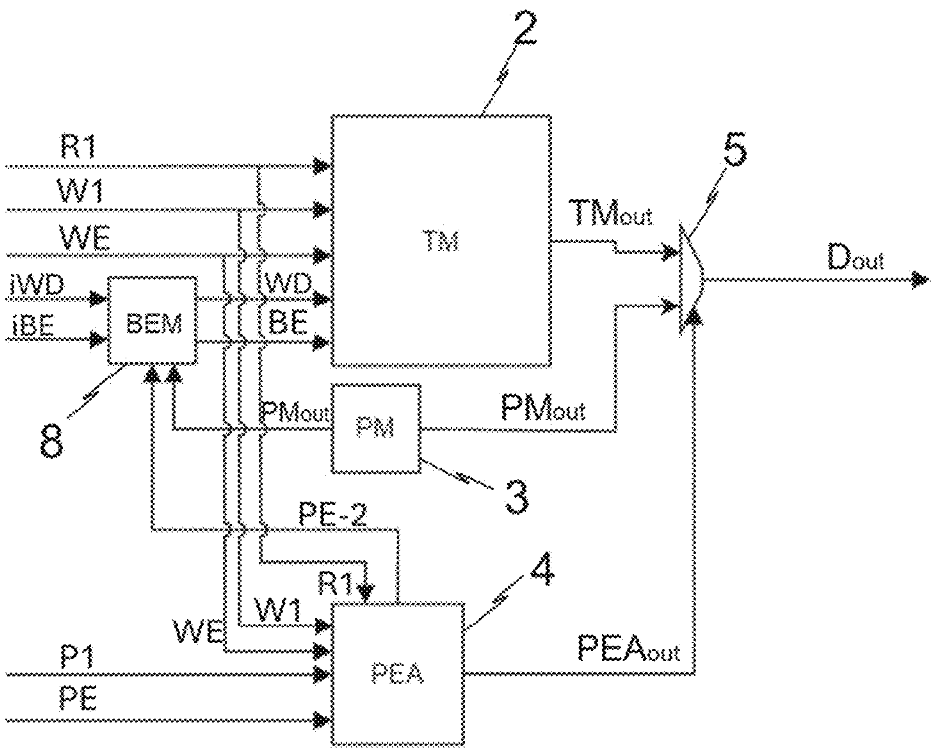
FIG. 6 illustrates a preferred embodiment of a digital circuit according to the first aspect of the disclosure.

A preferred embodiment of a digital circuit of the first aspect of the disclosure is explained next with reference to FIG. 6. The embodiment of FIG. 6 is according to the embodiments of FIG. 1 and FIG. 5 and hence comprises all the aforementioned features of the embodiments of FIG. 1 and FIG. 5. Moreover, the embodiment of FIG. 6 comprises a byte enable circuit 8 which is communicatively connected to the target memory 2, the pattern memory 3 and the pattern-enable array 4. Said byte enable circuit 8 is configured to receive an initial data bus input iWD and to provide to the target memory 2 the data bus input WD. Also, the pattern memory 3 is configured to provide to the byte enable circuit 8 its respective output $PM_{out}$ of data. Said output $PM_{out}$ of data is related to the pattern stored in the pattern memory 3. Also, as illustrated in FIG. 6, the pattern-enable array 4 is configured to provide to the byte enable circuit 8 a signal PE-2 which is indicative of whether the corresponding entry to be updated according to the input write address W1 is associated with the stored pattern or not. Moreover, in the embodiment of FIG. 6, the byte enable circuit 8 is configured to receive an initial byte enable signal iBE which comprises bits each of which corresponds to a respective byte of the initial data bus input iWD such that the value of each bit of the initial byte enable signal iBE indicates whether the respective byte of the initial data bus input iWD should be updated according to a corresponding byte of the output $PM_{out}$ of the pattern memory 3 or not. When during an operation of the embodiment of FIG. 6 the signal PE-2 provided to the byte enable circuit 8 indicates that the corresponding entry to be updated is associated with the stored pattern, the byte enable circuit 8 is configured to transform the initial data bus input iWD into the data bus input WD such that during the transformation the bytes of the initial bus input iWD are updated or not according to what is indicated by the initial byte enable signal iBE. Said corresponding entry is specified by the input write address W1.

Figure 9:
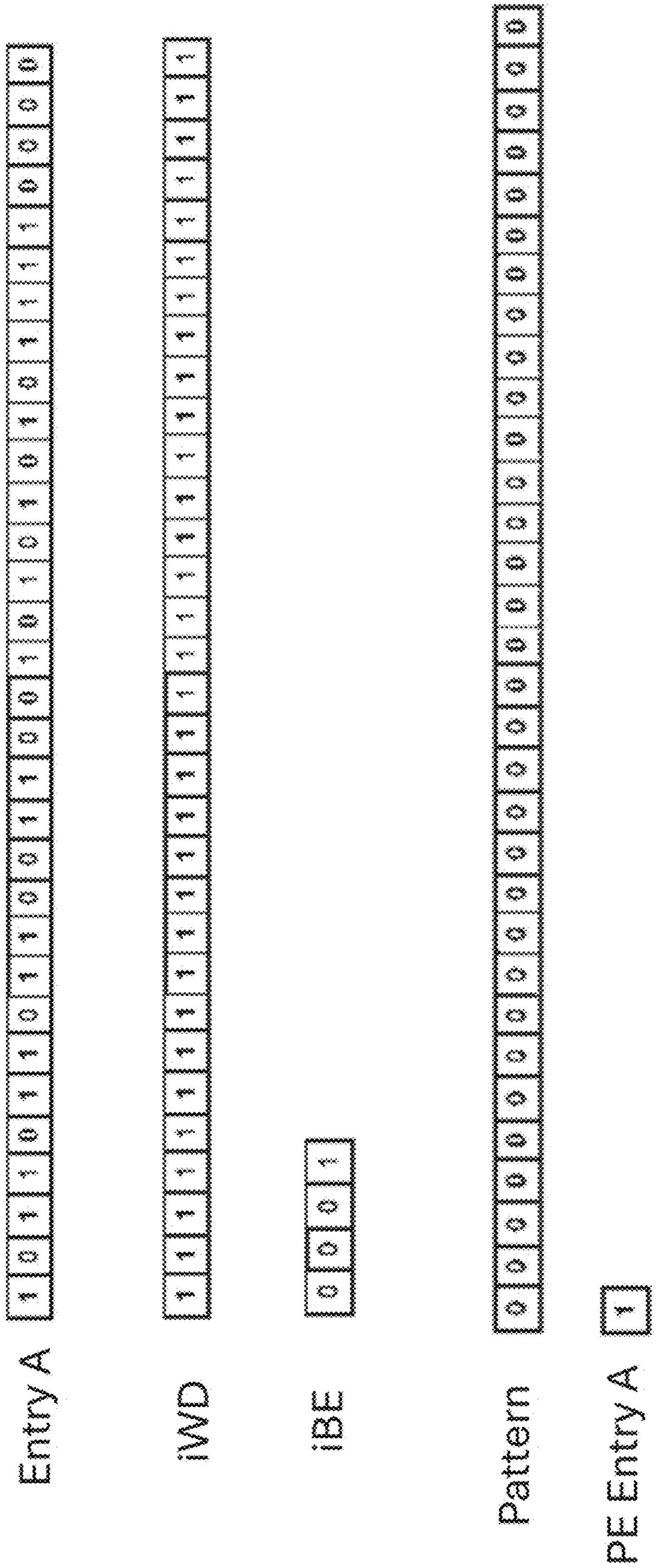
FIG. 9 illustrates examples of data inputs, entries, a pattern and other information related to an operation of a preferred embodiment of a digital circuit according to the disclosure.
Figure 10:
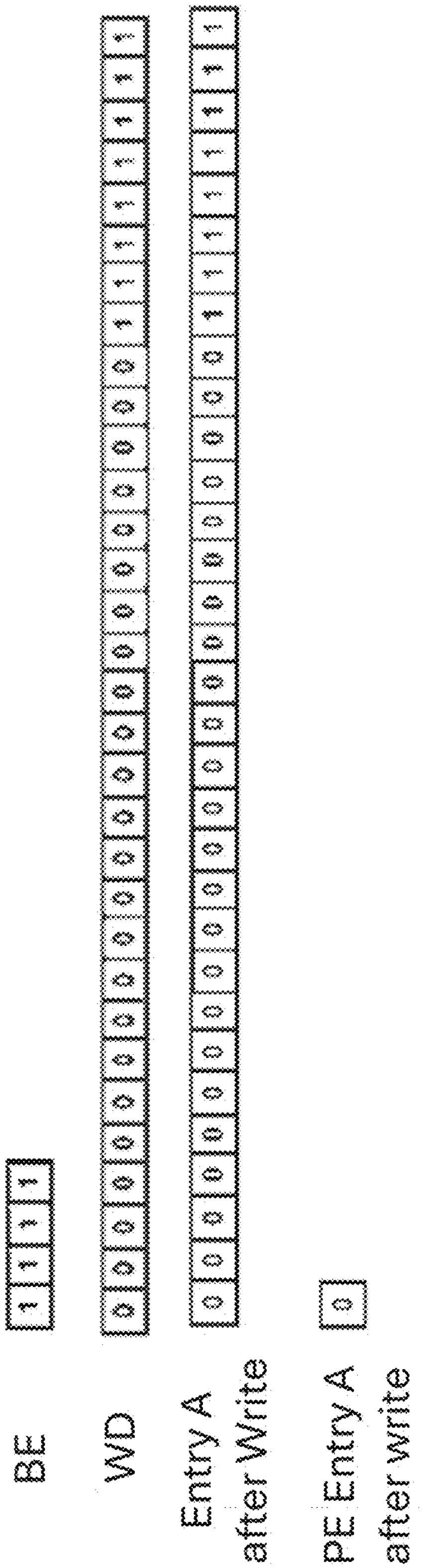
FIG. 10 illustrates examples of an entry and other information related to an operation of a preferred embodiment of a digital circuit according to the disclosure.
Figure 15:
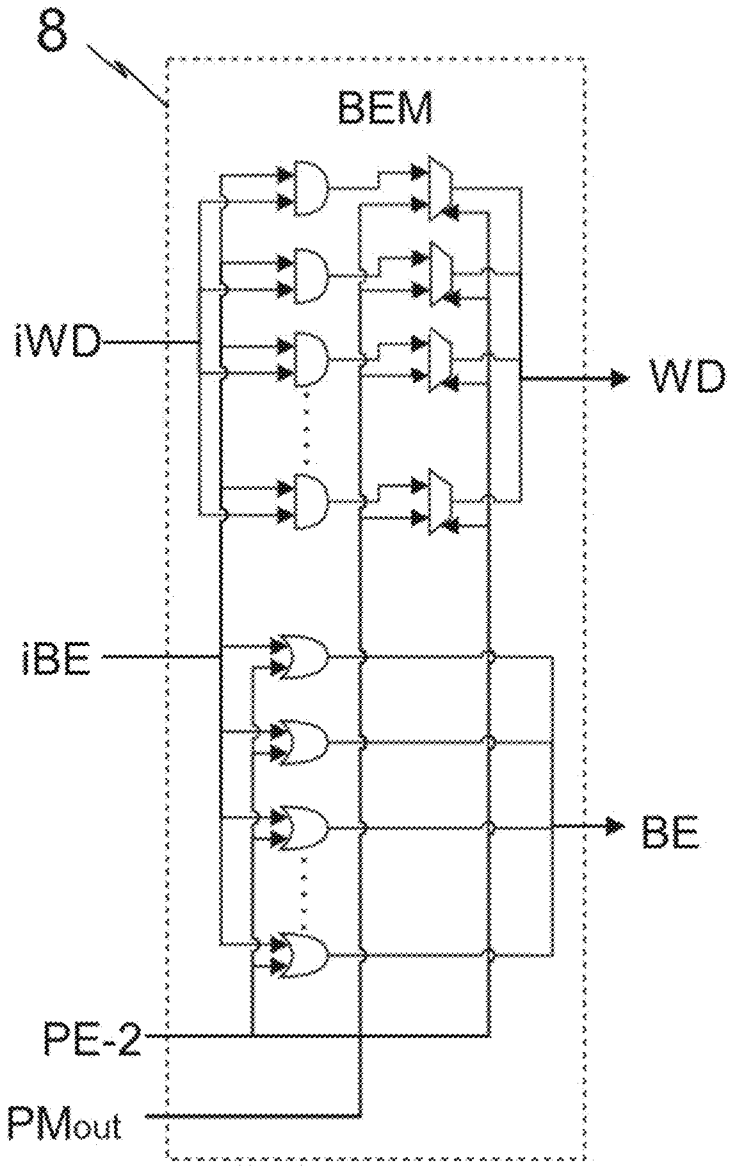
FIG. 15 illustrates part of a preferred embodiment of a digital circuit according to the first aspect of the disclosure.

An example of a write/update operation that may be performed in/with the embodiment of FIG. 6 for updating an entry in the TM, is explained next with reference to FIG. 9-10. In the example of FIG. 9-10, a user wishes to modify the original entry A of the TM, using the data of the initial data bus input iWD. In the example of FIG. 9-10 the original entry A, the initial data bus input iWD and the initial byte enable signal iBE are the same as in the case of FIG. 8. Moreover, in the example of FIG. 9-10, the pattern stored in the pattern memory PM corresponds to all "0"s (i.e. the value of each one of the bits of the pattern is "0"), and the pattern enable signal PE is originally set to "1" as shown in FIG. 9, thereby indicating that the pattern is "active" for the entry A. Therefore, the signal PE-2 provided to the byte enable circuit 8 by the pattern-enable array 4 is also originally set to "1". Consequently, the bytes enable circuit 8, which may also be called byte enable merger BEM, transforms the iWD into the WD shown in FIG. 10. As a result of transformation, the iWD's byte which is set (i.e. the iWD's byte for which the corresponding bit of the initial byte enable signal iBE is "1") will not change and will be the same in the WD signal, while iWD's bytes that are unset (i.e. the corresponding values in the iBE are set to "0") will be updated with the corresponding values in the pattern which is stored in the pattern memory. The resulting data bus input WD that is outputted by the byte enable circuit 8 is shown in FIG. 10 which also shows that the all the bits of the byte enable signal BE are "1"s such that the entry A is completely updated so that after the write operation the entry A is the same as the WD. Therefore, it can be understood in the example of FIG. 9-10 the byte enable circuit 8 transforms the initial byte enable signal iBE into all "1"s in order to indicate that the entry A needs to be completely updated. Also, as shown in FIG. 10, as a consequence of the update of the entry A, the corresponding pattern enable entry ("PE Entry A" in FIGS. 9 and 10) in the pattern-enable array changes and from "1" becomes "0" after the write/updating operation. Also, with respect to an operation of the embodiment of FIG. 6, it is noted that when an entry is not associated with any pattern, the BE signal is identical to the iBE signal, and also the iWD is identical to the WD, allowing the update of an entry according to what the user needs. It is noted that the aforementioned optional byte enable circuit, i.e. byte enable merger ("BEM"), may be implemented in a number of different ways, and a non-limiting example of a BEM that may be used in a preferred embodiment of the disclosure is illustrated in FIG. 15.

Figure 11:
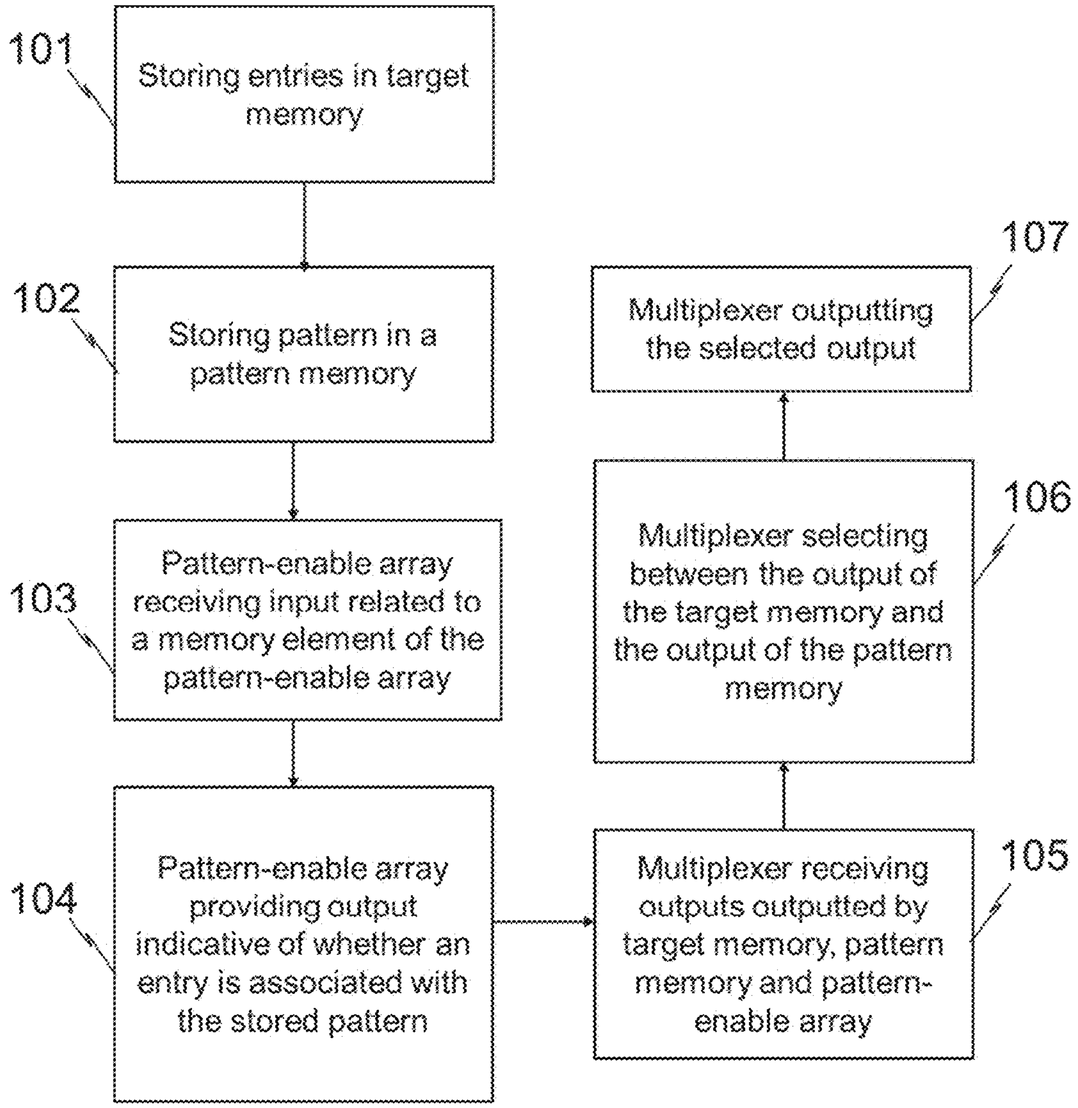
FIG. 11 illustrates a flow diagram of preferred embodiment of a method according to the first aspect of the disclosure.

The flow diagram of a preferred embodiment of a method of an operation in a digital circuit 1 according to the disclosure, is shown in FIG. 11. The embodiment of FIG. 11 may be implemented using anyone of the aforementioned preferred embodiments of FIGS. 1, 2, 5 and 6. The method of FIG. 11 comprises the following steps:

Step 101: storing entries in the target memory 2;

Step 102: storing a pattern in the pattern memory 3;

Step 103: the pattern-enable array 4 receiving a corresponding input related to any one of the memory elements 6;

Step 104: the pattern-enable array 4 providing a respective output which is indicative of the state of the memory elements 6;

Step 105: the multiplexer 5 receiving an output of the target memory 2, an output of the pattern memory 3 and an output of the pattern-enable array 4;

Step 106: the multiplexer 5 selecting between the received respective outputs of the target memory 2 and of the pattern memory 3 using the output of the pattern-enable array 4 for directing the selection; and Step 107: the multiplexer 5 outputting the selected output.

In a preferred embodiment of a method which is according to the method of FIG. 11, the method further comprises setting the state of any one of the memory elements 6 using a corresponding input received by the pattern-enable array 4 of the digital circuit.

In a preferred embodiment which is according to the previous one, the method further comprises: updating any one of the entries of the target memory 2; and setting automatically the respective memory elements 6 which is associated with the respective address of the updated entry to the state that is indicative that said respective address of the updated entry is not associated with the stored pattern.

In a preferred embodiment which is according to the previous one, the method further comprises updating the pattern in the pattern memory.

Figure 12:
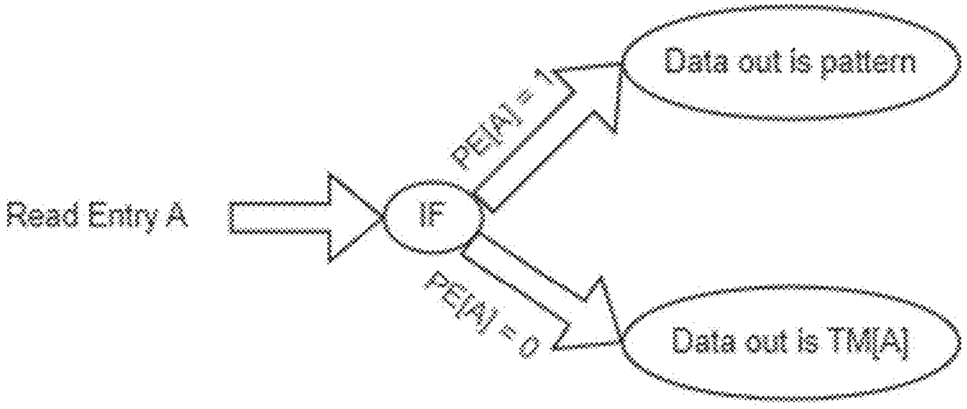
FIG. 12 illustrates a flow diagram of an example of an operation in a preferred embodiment of the disclosure.
Figure 13:
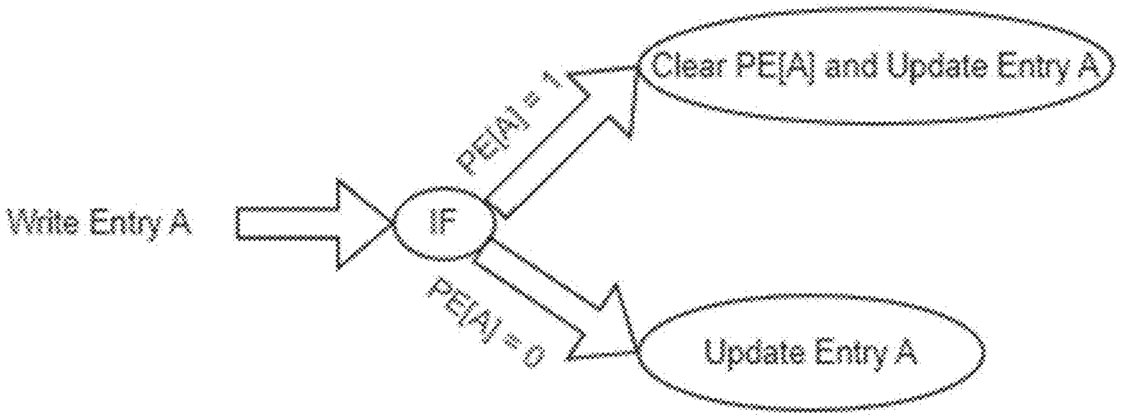
FIG. 13 illustrates a flow diagram of an example of an operation in a preferred embodiment of the disclosure.
Figure 14:
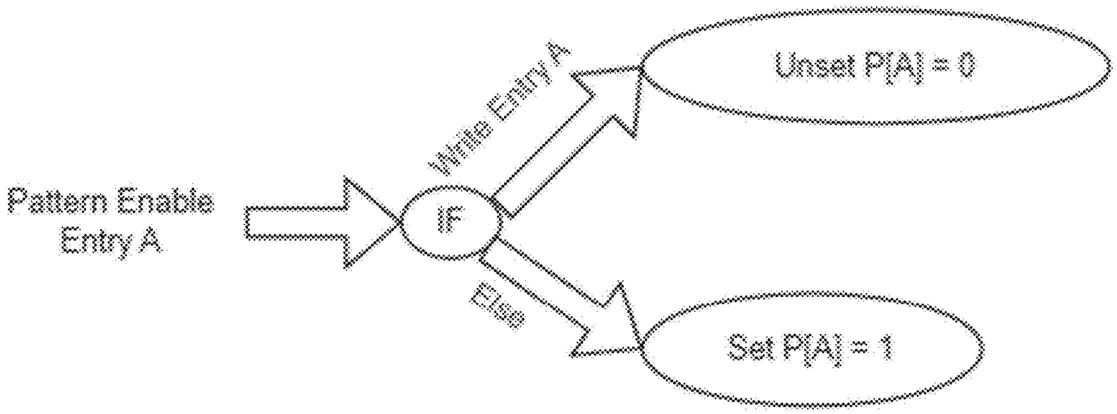
FIG. 14 illustrates a flow diagram of an example of an operation in a preferred embodiment of the disclosure.

FIG. 12-14 shows respective flow diagrams indicating the results of performing some operations with an preferred embodiment of the first aspect of the disclosure.

Specifically, FIG. 12 illustrates an operation wherein reading an entry A will result in reading the pattern from the PM if a corresponding value in the PEA for entry A is set to "1", or reading the data from TM is said corresponding value in the PEA is "0".

FIG. 13 illustrates an operation wherein writing into an entry A will always result in updating the entry A in the TM.

However, if the value in PEA for A is originally set to "1", then it will be cleared to "0".

FIG. 14 illustrates an operation wherein setting the pattern enable signal PE for entry A will result in updating the value in the PEA for entry A by setting it to "1" unless there is also being performed a write for the same entry in the same cycle. In the latter case, the write takes precedence and the value in the PEA for entry A will be cleared to "0".

In this text, the term "comprises" and its derivations (such as "comprising", etc.) should not be understood in an excluding sense, that is, these terms should not be interpreted as excluding the possibility that what is described and defined may include further elements, steps, etc.

The disclosure is obviously not limited to the specific embodiment(s) described herein, but also encompasses any variations that may be considered by any person skilled in the art (for example, as regards the choice of materials, dimensions, components, configuration, etc.), within the general scope of the disclosure as defined in the claims.

The invention claimed is:

1. A digital circuit comprising a target memory, a pattern memory, a pattern-enable array and a multiplexer, wherein;

the target memory is configured to store therein entries and to output a respective output of data related to any one of the entries;

the pattern memory is configured to store therein a pattern and to output a respective output of data related to the pattern;

the pattern-enable array comprises memory elements each of which is associated with a respective address of a corresponding one of the entries of the target memory and is configured to be reversibly set to a state which is indicative of whether the respective address of the corresponding entry of the target memory is associated with the stored pattern or not;

the pattern-enable array is further configured to receive a corresponding input related to any one of the memory elements and to output a respective output which is indicative of the state of the corresponding memory element; and the multiplexer is configured to receive the respective outputs of the target memory, of the pattern memory and of the pattern-enable array, to select between the received respective output of the target memory and the received respective output of the pattern memory using the output of the pattern-enable array for enabling the selection, and to output the selected output.

2. The digital circuit according to claim 1, wherein the pattern-enable array is configured to receive a respective input which comprises:

a pattern address input for indicating the address of a respective entry with which the pattern is to be associated with; and a pattern enable input for indicating that the address of the respective entry indicated by the pattern address input should be associated with the pattern.

3. The digital circuit according to claim 1, wherein the target memory is configured to receive a respective input which comprises:

an input read address for specifying a corresponding entry to be accessed in the target memory;

an input write address for specifying a corresponding entry to be updated in the target memory;

a data bus input for indicating data to be written in the target memory for updating the corresponding entry of the target memory; and a write enable input for indicating a request for a write operation to be performed at the target memory.

4. The digital circuit according to claim 3, wherein the respective input of the pattern-enable array comprises the input read address, the input write address and the write enable input.

5. The digital circuit according to claim 4, comprising an additional multiplexer via which the pattern-enable array provides its output, said additional multiplexer being part of the pattern-enable array and/or being configured to receive the input read address as a select line of said additional multiplexer.

6. The digital circuit according to claim 3, wherein the output of the target memory comprises data stored in the corresponding entry which is specified by the input read address.

7. The digital circuit according to claim 3, wherein the target memory is configured to allow updating one or more portions of one of the entries while leaving the rest of said one entry unchanged, each of said portions corresponding to a byte, such that the target memory has a byte enable functionality;

the respective input of the target memory further comprises a byte enable signal input which comprises bits each of which corresponds to a respective byte of the data bus input, such that the value of each bit of the byte enable signal input indicates whether each of the bytes of the corresponding entry of the target memory should be updated according to the corresponding byte of the data bus input or not.

8. The digital circuit according to claim 3, further comprising a byte enable circuit communicatively connected to the target memory, the pattern memory and the pattern-enable array;

the byte enable circuit is configured to receive an initial data bus input and to provide to the target memory the data bus input;

the pattern memory is configured to provide to the byte enable circuit its respective output of data related to the pattern stored in the pattern memory;

the pattern-enable array is configured to provide to the byte enable circuit a signal indicative of whether the corresponding entry to be updated according to the input write address is associated with the stored pattern or not;

the byte enable circuit is configured to receive an initial byte enable signal which comprises bits each of which corresponds to a respective byte of the initial data bus input such that the value of each bit of the initial byte enable signal indicates whether the respective byte of the initial data bus input should be updated according to a corresponding byte of the output of the pattern memory or not;

when the signal provided to the byte enable circuit by the pattern-enable array indicates that the corresponding entry to be updated is associated with the stored pattern, the byte enable circuit is configured to transform the initial data bus input into the data bus input such that during the transformation the bytes of the initial bus input are updated or not according to what is indicated by the initial byte enable signal, said corresponding entry being specified by the input write address.

9. The digital circuit according to claim 1, further comprising reset means which, when one of the entries of the target memory is updated, said reset means is configured to automatically set the respective memory elements of the pattern-enable array to the state that is indicative that the corresponding address of the updated entry is not associated with the stored pattern.

10. The digital circuit according to claim 1, wherein the pattern memory is rewritable such that the pattern stored therein is configured to be changed or updated.

11. The digital circuit according to claim 1, wherein the pattern memory is configured to store therein a plurality of patterns which are associable with one or more of the entries of the target memory.

12. A method of operation in a digital circuit which comprises a target memory, a pattern memory, a pattern-enable array and a multiplexer, the method including the following steps:

storing entries in the target memory;

storing a pattern in the pattern memory;

wherein the pattern-enable array comprises memory elements each of which is associated with a respective address of a corresponding one of the entries of the target memory and is configured to be reversibly set to a state which is indicative of whether the respective address of the corresponding entry of the target memory is associated with the stored pattern or not;

the method further comprising:

the pattern-enable array receiving a corresponding input related to any one of the memory elements, and outputting a respective output which is indicative of the state of the memory elements;

the multiplexer receiving respective outputs outputted from the target memory, the pattern memory and of the pattern-enable array, selecting between the received respective outputs of the target memory and of the pattern memory using the output of the pattern-enable array for directing the selection, and outputting the selected output.

13. The method according to claim 12, further comprising setting the state of any one of the memory elements using the corresponding input received by the pattern-enable array.

14. The method according to claim 12, further comprising:

updating any one of the entries of the target memory; and setting automatically the respective memory elements which is associated with the respective address of the updated entry to the state that is indicative that said respective address of the updated entry is not associated with the stored pattern.

15. The method according to claim 12, further comprising updating the pattern in the pattern memory.

* * * * *